April 18, 1939.  H. SCHUSTER  2,154,534
METHOD OF MANUFACTURING ANNULAR DISKS
Filed Aug. 31, 1937
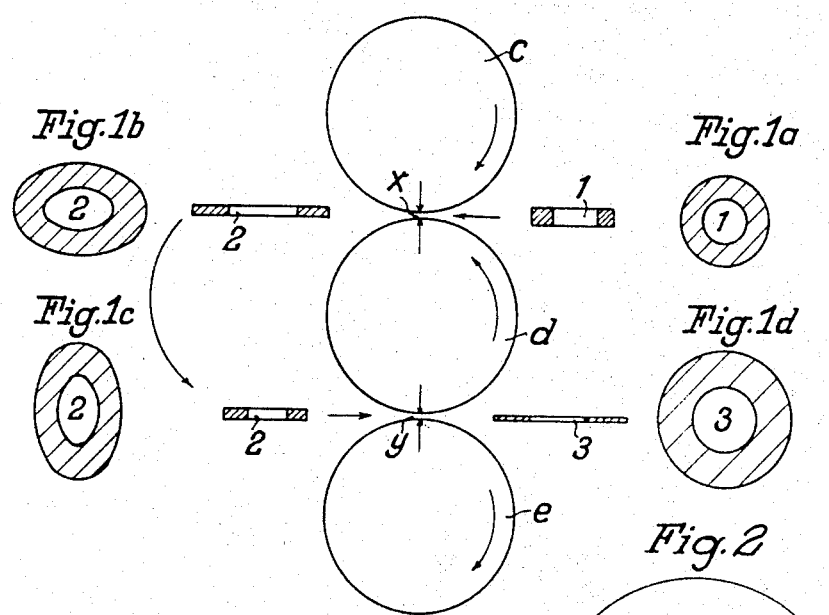
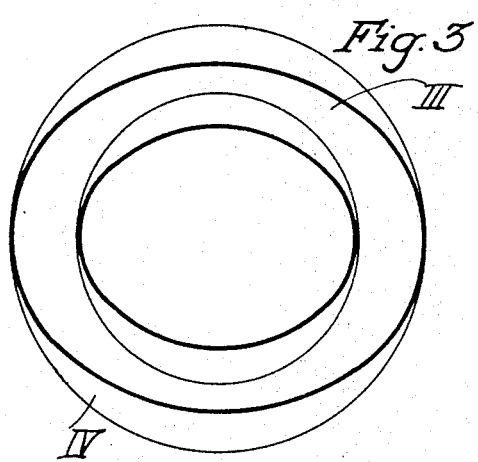
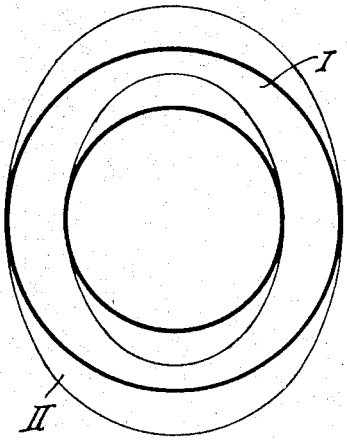
Inventor:
Hans Schuster
By Emery, Varney, Whittemore + Dix
Attorneys Patented Apr. 18, 1939

2,154,534

UNITED STATES PATENT OFFICE 2,154,534

METHOD OF MANUFACTURING ANNULAR DISKS

Hans Schuster, Immigrath, Niederrhein, Germany

Application August 31, 1937, Serial No. 161,726
In Germany August 14, 1937

7 Claims. (Cl. 80—60)

It has already been proposed for manufacturing metal disks with as little waste as possible, especially for automobile wheels, to roll out a thicker circular disk of smaller diameter in directions at an angle, preferably at right angles to one another, until the desired greater diameter and diminished thickness have been obtained. When it is a question of making an annular disk, in using this method a central circular disk of the desired inner diameter would be cut out or otherwise separated from the finished solid disk.

According to the invention the necessity of removing a central circular disk in the manufacture of an annular disk is avoided by starting with an annular blank and rolling this out in various directions at an angle, and preferably at right angles, to one another. In this way a large annular disk of exactly circular form can unexpectedly be obtained, although it would have been assumed that, since the inner free space of the annular blank is not acted upon by the rolling operation, difficulties would arise in the conversion in the successive stages of the rolling out. It has however been found by calculation and graphic investigations and also by practical experiments, that both the external and internal circumference of the ring pass from the circular into the elliptical shape and back into the circular shape, although the internal diameter does not increase in the same proportion as the external diameter. This has to be taken into consideration in fixing the dimensions of the annular blank. It will be necessary for the desired dimensions of the finished annular disk always previously to determine the corresponding dimensions of the original blank, if necessary with reference to previous experiments.

The method is explained with reference to the diagrammatic Figs. 1 and 1b to 1d in the accompanying drawing, assuming that a three-high mill is used. The blank is shown in Fig. 1 in cross-section while in Figs. 1b to 1d the blank is shown in elevation. The annular disk 1 used as the original blank and of small diameter and comparatively large thickness, is fed in the first pass into the space between the rolls c and d. By this means the annular disk is thinned and consequently extended by a percentage corresponding to the proportion between the thickness of the blank 1 and the roll opening x, so that the ring 2 with elliptical outer and inner periphery is obtained. This disk 2 is turned through 90° and fed through the opening y between the rolls d and e, whereby the proportion between the thickness of the blank 2 and the roll opening y, that is the percentage thinning, is the same as in the previous pass. In this way is obtained an annular disk 3 of exactly circular shape, the external and internal diameter of which are greater than in the blank. The percentage increase of the inner diameter is however smaller than the percentage increase of the external diameter, which latter is smaller than the diameter of a solid disk which would be obtained by the same rolling operation through a solid blank.

In Figs. 2 and 3 there is illustrated in plan on a larger scale the conversion of an annular blank into a larger and thinner annular disk.

In Fig. 2 I is the circular blank and II is the disk with elliptical periphery obtained in the first pass. In Fig. 3 III is the last disk turned through 90° and IV is the larger and thinner annular disk obtained in the second pass. In this case a stretching, that is a thinning, of 25% in each pass is assumed. By comparing I and IV it will be seen that the external and the internal diameter in IV are greater than in I, but these two diameters have not been increased in the same proportion. The percentage increase of the internal diameter is smaller than that of the external diameter.

As many passes are used as are necessary for obtaining the final dimensions. The percentage thinning in returning to the circular shape must in each case correspond to the percentage thinning in converting into the shape with elliptical periphery. It is also possible to use two or more passes without altering the rolling direction, more particularly without rotating the blank, if afterwards the blank is thinned by a percentage corresponding to the total thinning thus obtained.

When the rolling is changed not by 90° but by another angle, it is preferable to use an angle such that the smallest total angle of rotation is an integral multiple of this angle, as is the case, for example, with angles of 45° and 30°.

The change in the rolling direction can also be obtained by individual rolling mills being placed at corresponding angles to one another, in which case it is not necessary to rotate the blank when it is passing from one pair of rollers to another.

In addition to the manufacture without waste, the further advantage should be mentioned which is due to the fact that the rollers near to the middle of the blank are not stressed to a greater extent than in the other parts of the blank as in the case of a solid disk, since there is no material in the middle of the disk. This advantage consists in this, that the rollers are not bent apart in the middle more than at the ends during the passage of the blank, so that the distance between the rolls, on which depends the maintenance of the same percentage thinning, remains uniform without any auxiliary means. Further, the manufacture of the original blank is facilitated by the annular shape if the blanks are made by cutting up a hollow cylindrical steel ingot into a number of disks. By means of the internal hollow space interruptions are avoided in the working of the cutting tool which however always occur when cutting up a solid ingot.

The annular steel discs made according to the invention are suitable for various purposes, in some cases with and in some cases without further working. The example of the use as disks for automobile wheels has already been mentioned. In this case the disks can be used flat or after having been dished.

A practical example is given below. The initial blanks were rings of 220 mm. external diameter, 132 mm. boring, 50 mm. thick. After rolling in a large number of passes each with 22% thinning, the following dimensions were obtained: external diameter 425 mm., boring 207 mm., thickness 12 mm.

What I claim is:—

1. The method of manufacturing thin annular disks from thicker annular disks, which comprises, rolling the thicker disk along one axis across its width to thin it, increase its area, and elongate it along the axis of rolling, turning the disk and rolling it along another axis, and continuing the turning and rolling operations until a thinner annular disk having the same interior and exterior shape as the original disk is produced.

2. The method of manufacturing thin annular disks from thicker annular disks, which comprises, rolling a thick annular circular disc along a first axis across its width to thin it, increase its area, and change it into a first elliptical shape, turning the disk and rolling it along another axis, and continuing the turning and rolling until an annular circular disk of the desired thickness is produced.

3. The method of manufacturing thin annular disks from thicker annular disks, which comprises, axially rolling and turning a thick annular circular disk in alternation while effecting the same percentage of reduction in each angularly turned position to first change the circular disk to elliptical shape and subsequently back into true circular shape both interiorly and exteriorly.

4. The method of manufacturing thin annular circular disks from thicker annular circular disks, which comprises, rolling the disk along an axis to effect a given percentage of reduction and thereafter alternately turning the disk through one of the angles 15, 30, 45, 60 and 90 degrees and rolling the disk along new axes while effecting along each axis the same percentage of reduction as along the first axis, to change the disk from circular to elliptical shape and back into true circular shape both interiorly and exteriorly.

5. The method as set forth in claim 4, further characterized by the fact that the disk is repeatedly changed from circular to elliptical and back to circular shape, the disk being made substantially truly circular at each approach to circular shape before again being changed into elliptical shape.

6. The method as set forth in claim 4, further characterized by the fact that the last rolling which changes the disk back to circular shape is effected along the minor axis of the last ellipse.

7. The method as set forth in claim 4, further characterized by the fact that the total angle of turning from circular-to-circular shape is made to equal 90 degrees divided by half the angle of turning, minus 1, times the angle of turning, or 90, 120, 135, 150 and 165 degrees for the angles of turning of 90, 60, 45, 30 and 15 degrees respectively.

HANS SCHUSTER.